United States Patent [19]
Chudoba et al.

[11] Patent Number: 5,761,359
[45] Date of Patent: Jun. 2, 1998

[54] MOUNTING SLEEVE FOR OPTICAL FIBER CONNECTORS AND METHOD OF USE

[75] Inventors: Paul Chudoba. Shohola; Jerome Polizzi. Morrisville. both of Pa.

[73] Assignee: NuVisions International, Inc.. Shohola. Pa.

[21] Appl. No.: 799,435

[22] Filed: Feb. 13, 1997

[51] Int. Cl.$^6$ .................................................. G02B 6/36
[52] U.S. Cl. ................................. 385/78; 385/60; 385/72
[58] Field of Search ................................. 385/78, 53, 60, 385/72, 76

[56] References Cited

U.S. PATENT DOCUMENTS

| | | | |
|---|---|---|---|
| 4,579,418 | 4/1986 | Parchet et al. | 385/78 X |
| 4,697,870 | 10/1987 | Richards | 385/78 |
| 4,737,009 | 4/1988 | Kakii et al. | 385/60 |

*Primary Examiner*—Phan T. H. Palmer
*Attorney, Agent, or Firm*—Charles S. McGuire; George R. McGuire

[57] ABSTRACT

A device for releasably connecting ferrle-mounted optical fibers in optical communication to other such fibers or to optical equipment having the same or different styles of connector assemblies. for purposes of conducting testing, calibration and similar operations of the fibers. The device essentially comprises a plurality of optical fiber connector assemblies and a single mounting sleeve. Each of the connector assemblies includes structure compatible with a particular form of fiber optic ferrule. and an externally threaded portion at one end. The mounting sleeve is hollow at both ends and internally threaded over a portion of its axial length from each end. The internal threads adjacent one end of the sleeve are engageable with the exteral threads on each of the connector assemblies. whereby any one of such assemblies may be threadedly engaged to a predetermined depth with one end of the sleeve. The internal theads at the other end of the sleeve may be configured for threaded engagement with the external threads of a nipple surrounding a connector portion on a piece of optical equipment, and/or with the threaded portion of the connector assemblies.

18 Claims, 2 Drawing Sheets

5,761,359

MOUNTING SLEEVE FOR OPTICAL FIBER CONNECTORS AND METHOD OF USE

BACKGROUND OF THE INVENTION

The present invention relates to optical fiber connectors and means for releasably attaching such connectors to test equipment, and the like, as well as to one another. More specifically, the invention pertains to a mounting sleeve to which optical fiber connector assemblies of various styles may be releasably attached for optical connection of a fiber held by one such connector either to standard test equipment, or the like, or to the fiber of another connector of the same or different style.

In the evolution of practical applications of optical fibers, it has become standard practice to mount one or more fibers in structure known as a ferrule and to attach to the ferrule a connector assembly adapted to be releasably affixed to other optical equipment. Ferrules are currently manufactured in several different configurations, and the connector is tailored for cooperative engagement with a particular ferrule. Hence, optical fiber connectors are available in a variety of styles, among which are those identified by the designations SMA, ST (TM of AT&T), FC, D4 (TM of NBC), Biconic (TM of Western Electric), etc.

The connector structure may include an internally threaded sleeve dimensioned for threaded engagement with a nipple on a piece of optical equipment such as a calibrated light source, a light intensity detector, etc., for testing or other purposes. Such connector/sleeve structures are commonly known as connector adapters and, being precision machined parts, are relatively expensive items. It is currently necessary for a user of such equipment to procure a separate connector adapter for each connector style to be used, and to disconnect one connector adapter and reconnect another to the test equipment each time a different style is required. Moreover, presently available connector adapters are suitable only for optical connection of the fiber(s) mounted in one style of ferrule/connector to an inlet/outlet port of test equipment, or the like, with no provision for connection to another connector of the same or different style.

It is a principal object of the present invention to provide apparatus for releasable connection of ferrule-mounted optical fibers in optical communication with other such fibers or with optical equipment in a more cost-effective manner. That is, the cost to the user of all parts necessary to effect temporary connection of any of several industry-standard styles of connectors to test equipment, or the like, is less than that of apparatus currently required for a like number of different styles.

A further object is to provide novel and improved optical fiber connector-adapter apparatus which permits faster, and therefore more efficient changing from one style of connector to another when performing testing, calibration and other such operations.

Still another object is to provide means by which ferrule-mounted optical fibers may be quickly and easily placed in optical communication with other fibers having the same or different styles of connector assemblies.

A still further object is to provide a novel and improved method of releasably attaching ferrule-mounted optical fibers to inlet/outlet ports of optical equipment in a manner which is more convenient and economical than prior art methods.

Other objects will in part be obvious and will in part appear hereinafter.

SUMMARY OF THE INVENTION

In accordance with the foregoing objects, the invention comprises a plurality of optical fiber connector assemblies and a single mounting sleeve. Each of the connector assemblies includes structure compatible with a particular form of fiber optic ferrule, and an externally threaded portion adjacent one end. The mounting sleeve is hollow, open at both ends and internally threaded over at least portions of its axial length from each end. The internal threads adjacent one end of the sleeve are engagable with the external threads on each of the connector assemblies, whereby any one of such assemblies may be threadedly engaged to a predetermined depth with one end of the sleeve. The internal threads at the other end of the sleeve may be configured for threaded engagement with the external threads of a nipple surrounding a connector portion a piece of optical equipment, and/or with the threaded portion of the connector assemblies.

Thus, any one of several different styles of connector assemblies, each having a threaded portion identical to a threaded portion on each of the other connector assemblies, may be threadedly engaged with one end of a single mounting sleeve; the other end of the sleeve may be threadedly engaged with a connector port nipple or with another connector assembly of the same or different style than the one coupled to the first end of the sleeve. Connector assemblies may be quickly and easily interchanged as desired with the common mounting sleeve.

The foregoing and other features of the invention will be more readily understood and fully appreciated from the following detailed description, taken in conjunction with the accompanying drawings.

DETAILED DESCRIPTION

Figure 1:
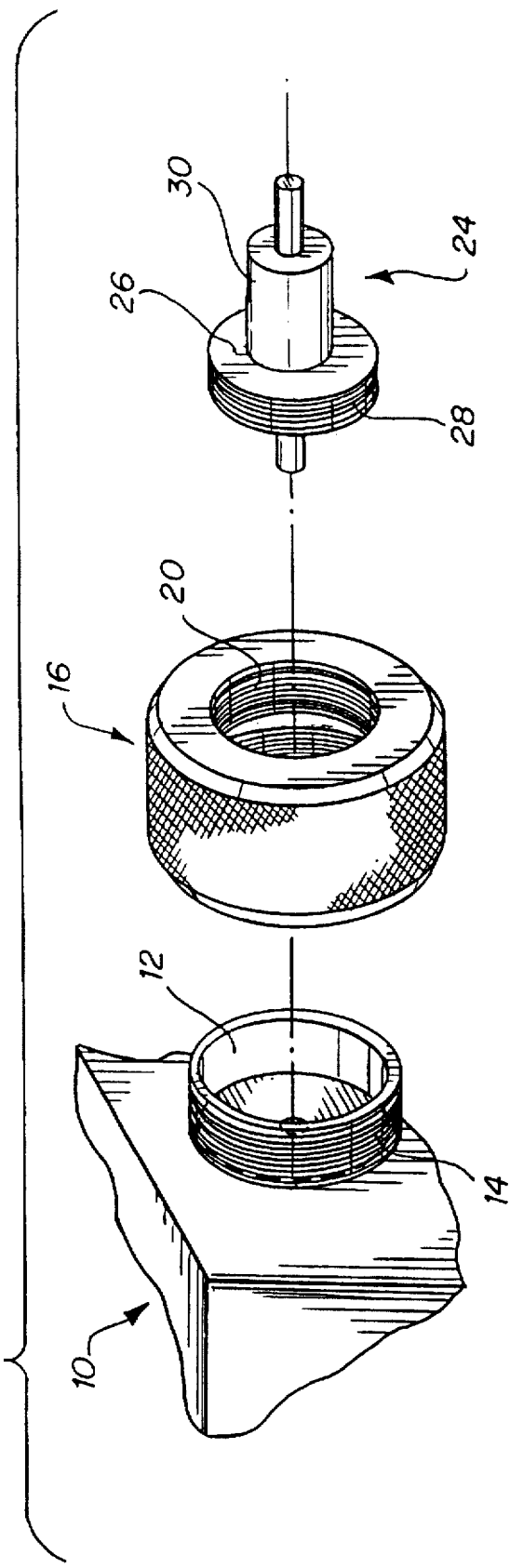
FIG. 1 is a perspective view of a first embodiment of the mounting sleeve of the invention, shown with one of the connector styles of the invention and a fragment of conventional equipment to which optical fibers may be releasably connected.

Referring now to the drawings, a fragment of an item of conventional equipment for use in connection with optical fibers, e.g., a calibrated light source or light intensity meter, is denoted generally by reference numeral 10. An inlet-outlet port for optical communication of an external optical fiber with the interior of equipment 10 is surrounded by nipple 12 having external threads 14. That is, each connector adapter has an internally threaded portion compatible with threads 14, but each differs from the others in the connector structure required for compatibility with various manufacturers' fiber optic connector assemblies.

Mounting sleeve 16 is in the nature of a hollow cylinder, open at both ends and internally threaded from each end for portions of its length. Threads 18 at one end are compatible with threads 14 for releasable attachment of sleeve 16 to equipment 10. Threads 29 extend from the other end of sleeve 16 to stop 22 which limits advance of a threaded member into the other end of the sleeve. Connector 24 is formed with flange 26 at one end. External threads 28 on flange 26 are compatible with threads 20, permitting threaded engagement of connector 24 with sleeve 16. The end of connector 24 opposite flange 26 is denoted by reference numeral 30 and is of the style known in the industry as an SMA connector assembly.

Figures 3A, 3B, 3C:
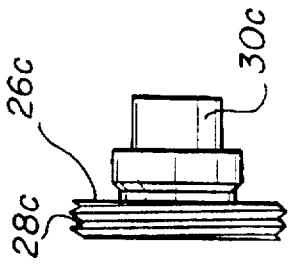
FIGS. 3A–3C are side elevational views of additional connector styles, each in section through the center.
Figure 2:
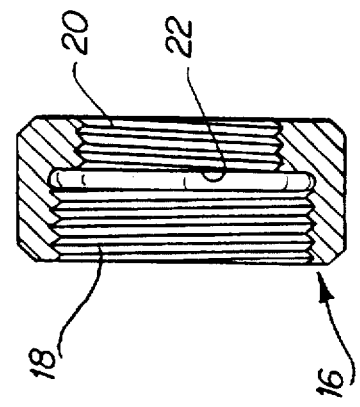
FIG. 2 is a side elevational view, in section through the center, of the mounting sleeve of FIG. 1.

The connectors shown in FIGS. 3A–3C each have at one end a flange, indicated by numerals 26a–26c, respectively, having threads 28a–28c. Each of threads 28a–28c is identical to threads 28, whereby any one of connectors 26a–26c may replace connector 27 in threaded engagement with threads 20 of sleeve 16. Portion 30a of connector 26a is of the style known as an ST connector assembly; portion 30b of connector 26b is of the style known as FC; portion 30c of connector 26c is of the style known as D4.

Figure 4:
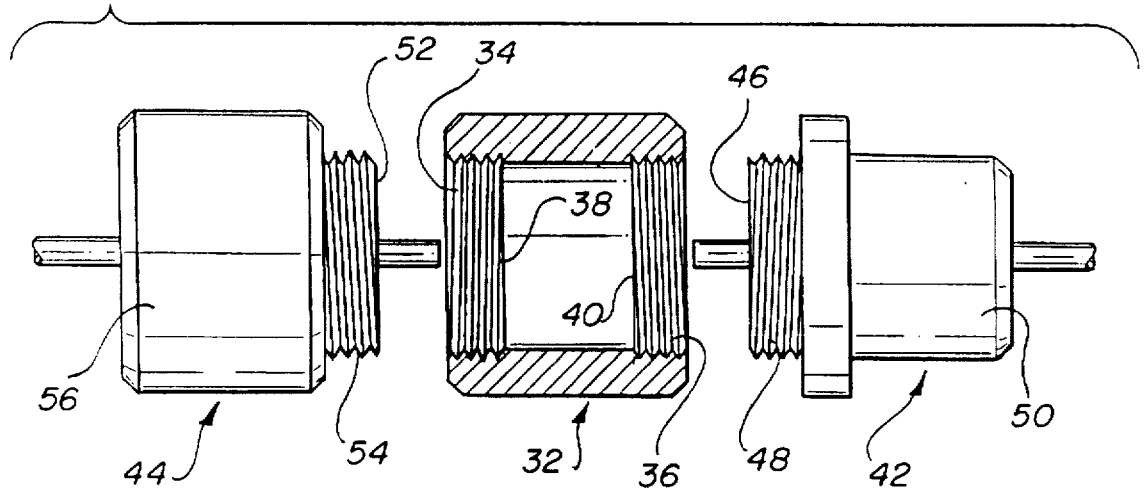
FIGS. 4 and 5 are side elevational views of a second embodiment of the mounting sleeve and a pair of connectors in axially spaced and fully assembled relation, respectively, all parts being in section through the center.
Figure 5:
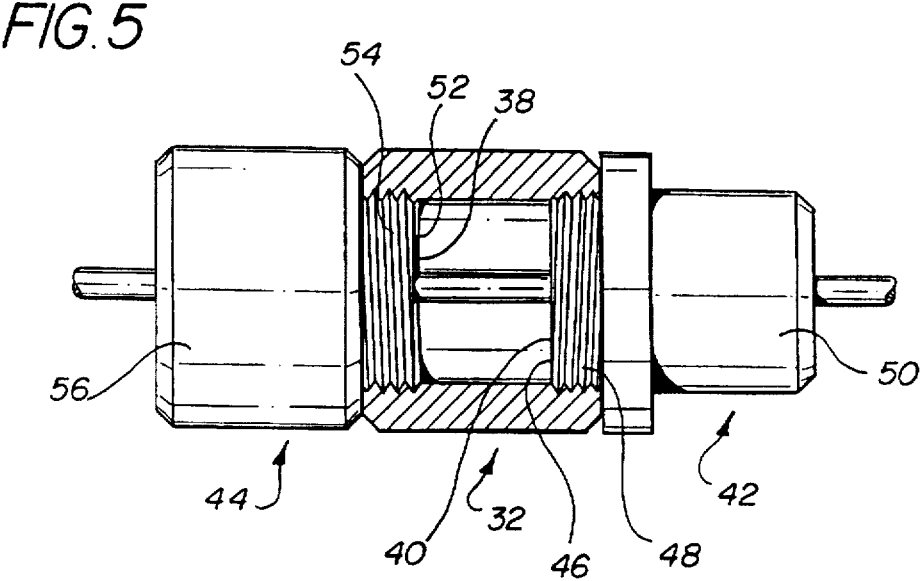

In FIGS. 4 and 5 is shown an embodiment of mounting sleeve denoted by reference numeral 32 having identical threaded portions 34 and 36 extending from opposite ends to stops 38 and 40, respectively. Also shown in FIGS. 4 and 5 are a pair of connector assemblies 42 and 44. End portion 46 of connector 42 is provided with external threads 48 and portion 50 is of the style known as BIC. End portion 52 of connector 44 has external threads 54 and portion 56 is of a configuration known as SC style. Threads 38 and 54 are identical to one another and to threads 34 and 36, whereby connectors 42 and 44 may be mutually coupled by threading into opposite ends of sleeve 32, thereby placing the optical fibers of ferrules engaged with connectors 42 and 44 in optical Ha communication with one another.

It should also be noted that threads 28, 28a, 28b, and 28c are compatible with threads 34 and 36, whereby any pair of connectors 26, 26a, 26b, 26c, 42 and 44 may be coupled to one another, placing their respective fibers in optical communication, by means of sleeve 32.

What is claimed is:

1. Apparatus for removably mounting a cylindrical ferrule wherein an optical fiber is mounted with terminal ends of the ferrule and fiber essentially coplanar in predetermined relation to a port of optical apparatus surrounded by a nipple having first, external threads, said apparatus comprising:
   a) a hollow cylindrical mounting sleeve having a central axis and open, first and second, opposite ends;
   b) first and second, internal threads extending from said first and second ends, respectively, toward the other of said ends;
   c) a fiber optic connector having an industry-standard style of body coupled to said ferrule in coaxially surrounding relation; and
   d) a cylindircal portion fixedly attached to said connector body and having a flanged portion, second, external threads, said first external and internal threads being mutually compatible for threaded attachment of said flanged portion to said second end of said sleeve.

2. The invention according to claim 1 wherein said second, internal threads terminate at a stop axially spaced from the termination of said first, internal threads.

3. The invention according to claim 2 and further including a second ferrule with an optical fiber mounted therein and a second fiber optic connector having a second industry-standard style of body coupled to said second ferrule, and a second cylindrical portion fixedly attached to said second connector body and having third, external threads, essentially identical to said second external threads, for selective threaded attachment of either of said flanged portions to said second end of said sleeve.

4. Apparatus for selective mounting of any of a plurality of optical fibers, each mounted in a respective ferrule, in operational relation to conventional optical apparatus having an inlet/oulete port surrounded by a nipple having first, external threads, said apparatus comprising:
   a) a hollow, cylindrical, mounting sleeve having a central axis and open, first and second, opposite ends;
   b) first and second, internal threads extending from said first and second ends, respectively, toward the other of said ends;
   c) a first fiber optic connector having a first, industry-standard style of body coupled to a first of said ferrules in coaxially surrounding relation;
   d) a second fiber optic counnector having a second, industry-standard style of body coupled to a second of said ferrules in coaxially surrounding relation;
   e) a first cylindrical portion fixedly attached to said first connector body and having second, external threads; and
   f) a second cylindrical portion fixedly attached to said second connector body and having third, external threads;
   g) said first external and internal threads being mutually compatible for threaded attachment of said first end of said sleeve to said nipple, and said second internal thread being mutually compatible with both of said second and third, external threads, whereby any of a plurality of ferrule-mounted fibers, each equipped with a fiber optic connector having an industry-standard body style different from that of other ferrule-mounted fibers of the plurality, may be operatively connected to optical apparatus with a single mounting sleeve.

5. The invention according to claim 4 wherein said first and second bodies each have a central axis and said first and second cylindrical portions are fixedly attached in coaxial relation to said bodies.

6. The invention according to claim 5 wherein said first and second cylindrical portions comprises flanges having diameters larger than the largest cross-dimensions of said first and second bodies.

7. The invention according to claim 6 wherein said first and second styles of bodies are different ones of ST, FC and D4 industry-standard fiber optic connector body styles.

8. The invention according to claim 5 wherein said first and second cylindrical portions comprise flanges having diameters less than the smallest cross-dimension of the portions of said first and second bodies to which they are respectively connected.

9. The invention according to claim 8 wherein one of said first and second styles of bodies is an SC style and the other is a BIC style.

10. The invention according to claim 4 wherein said first and second, internal threads terminate at axially spaced positions, thereby providing an unthreaded, interior portion of said sleeve.

11. A device for optically connecting a pair of optical fibers mounted within respective ferrules each of which is coupled to an optical fiber connector having an industry-standard body style, said device comprising:
   a) a hollow, cylindrical sleeve having open, first and second opposite ends;
   b) first and second, internal threads extending from said first and second ends, respectively, toward the other of said ends;
   c) a first cylindrical portion fixedly attached to a ffirst of said connector bodies, said first cylindrical portion having first, external threads compatible with said first, internal threads for threaded attachment of said first cylindrical portion to said sleeve with the terminal end of the ferrule coupled to said first connector body positioned within said sleeve; and d) a second cylindrical portion fixedly attached to a second of said connector bodies, said second cylindrical portion having second, external threads compatible with said second, internal threads for threaded attachment of said second cylindrical portion with the terminal end of the ferrule coupled to said second connector body abutting said terminal end of the ferrule coupled to said first connector body.

12. The invention according to claim 11 wherein said first connector body is of a style different from the style of said second connector body.

13. The invention according to claim 12 wherein said first and second, external threads are identical, each being compatible with both of said first and second, internal threads.

14. The invention according to claim 13 wherein said sleeves are coaxially aligned with the central axis of said sleeve.

15. A method of removably mounting a first optical fiber mounted in a first ferrule coaxially surrounded by a first connector body of industry-standard style in predetermined relation to one of an optical apparatus port surrounded by a nipple having first, external threads and a second ferrule coaxially surrounded by a second connector body of industry-standard style, said method comprising:

a) providing a hollow, cylindrical sleeve having first and second, open ends;

b) forming first and second, internal threads extending from said first and second ends, respectively, of said sleeve;

c) fixedly attaching first and second cylindrical portions to said first and second connector bodies, respectively, said first and second cylindrical portions having second and third, external threads, respectively;

d) threadedly engaging said second external threads with said first internal threads; and e) threadedly engaging one of said first and third external threads with second internal threads.

16. The method of claim 15 wherein said first external threads are engaged with said second internal threads.

17. The method of claim 15 wherein said third external threads are engaged with said second internal threads.

18. The method of claim 15 wherein said first connector body is of a style different from the style of said second connector body.

* * * * *